United States Patent [19]
Whitley et al.

[11] 3,783,763
[45] Jan. 8, 1974

[54] DATA RECORDING CAMERA

[75] Inventors: Ernest M. Whitley, Palo Alto; Don L. Beaman; William S. McCombie, both of Sunnyvale, all of Calif.

[73] Assignee: Redlake Corporation, Santa Clara, Calif.

[22] Filed: Dec. 29, 1971

[21] Appl. No.: 213,320

[52] U.S. Cl................ 95/31 EL, 95/1.1, 95/31 R, 95/31 C, 352/72, 226/176
[51] Int. Cl.... G03b 1/32, G03b 17/22, G03b 19/02
[58] Field of Search..................... 95/31 EL, 31 AC, 95/31 R, 1.1, 31 C; 352/72; 226/176, 177

[56] References Cited
UNITED STATES PATENTS

| | | | |
|---|---|---|---|
| 2,552,250 | 5/1951 | Bornemann et al. | 95/31 EL |
| 3,078,771 | 2/1963 | Robbins et al. | 95/31 C X |
| 2,588,954 | 3/1952 | Bornemann | 95/31 C |
| 3,137,429 | 6/1964 | Joslow | 226/176 |
| 3,269,288 | 8/1966 | Sigmond | 95/31 EL X |
| 2,161,391 | 6/1939 | Schubert | 95/31 EL |
| 3,547,015 | 12/1970 | Dalton | 95/1.1 |
| 2,827,834 | 3/1958 | Chevillon et al. | 95/31 EL X |
| 3,460,891 | 8/1969 | Bley et al. | 95/31 EL X |
| 3,662,938 | 5/1972 | Hagiwara | 226/176 X |

Primary Examiner—Robert P. Greiner
Attorney—Schapp and Hatch

[57] ABSTRACT

A data recording camera for periodically photographing oscilloscope displays, using a self-threading takeup cassette which may be removed without fogging remaining film, and a solenoid-driven pivoted-blade shutter which closes during automatic film advancing. Film is supplied from a supply spool and automatically severed adjacent the cassette by a solenoid-driven knife prior to release of the cassette from the camera. Data is projected from the oscilloscope face onto the emulsion side of the film by a lens system, and a removeable data slide may have the data written on it contact printed onto the rear side of the film by an internal lamp. The film is automatically advanced before and after the data card is projected onto it, and the camera is disabled during operations likely to fog the film. The interlocks also disable the camera when the cassette is not in place, when it is full, when the camera is out of film and when the film supply compartment is open. The electronic control circuit controls the duration of shutter opening, with decade incremental selection of duration, and also boosts shutter opening by applying an initial opening voltage higher than the subsequent holding voltage. Delay circuits allow the shutter to begin closing before the film is moved, and hold the shutter closed to allow time for film movement to be completed.

15 Claims, 12 Drawing Figures

INVENTORS
ERNEST M. WHITLEY
DON L. BEAMAN
WILLIAM S. McCOMBIE
BY Schapp & Hatch
ATTORNEYS

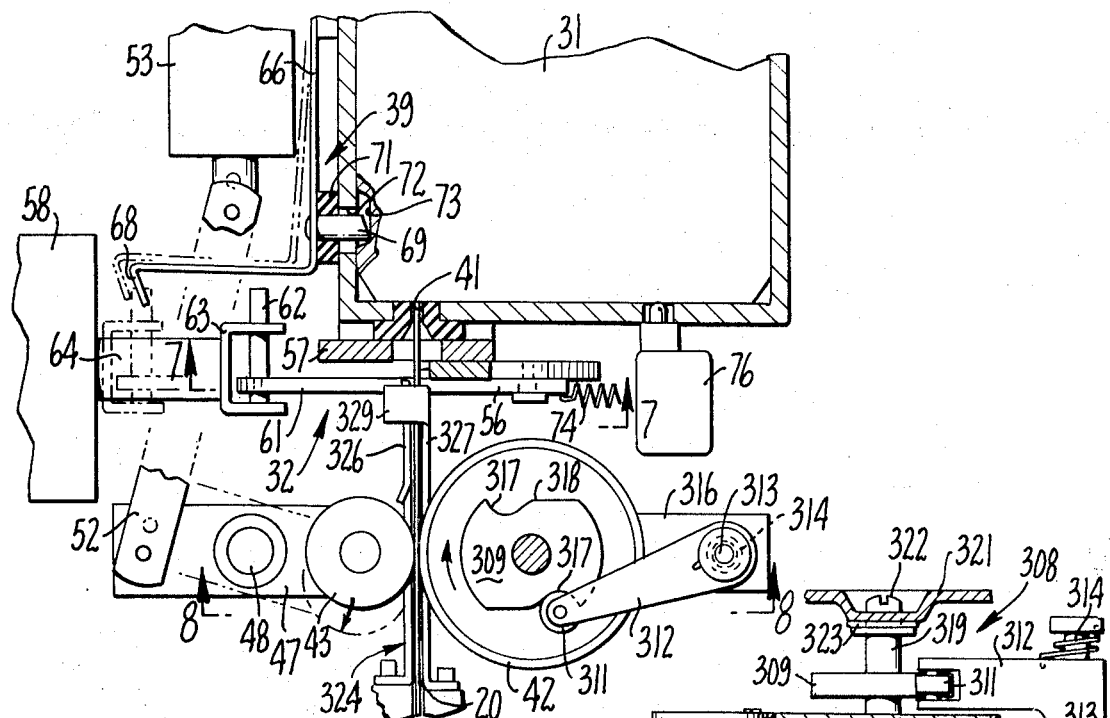
FIG. 6.
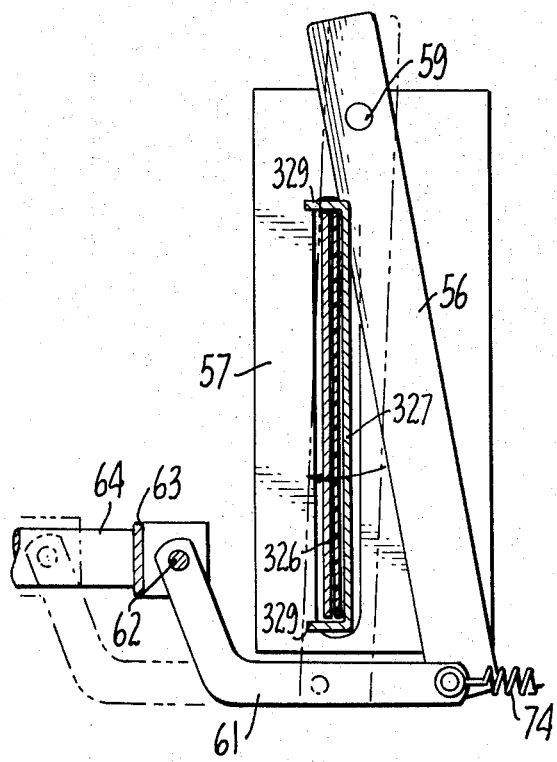
FIG. 7.
FIG. 8.
INVENTORS
ERNEST M. WHITLEY
BY DON L. BEAMAN
WILLIAM S. McCOMBIE
Schapp & Hatch
ATTORNEYS INVENTORS
ERNEST M. WHITLEY
DON L. BEAMAN
WILLIAM S. McCOMBIE
BY Schapp & Hatch
ATTORNEYS

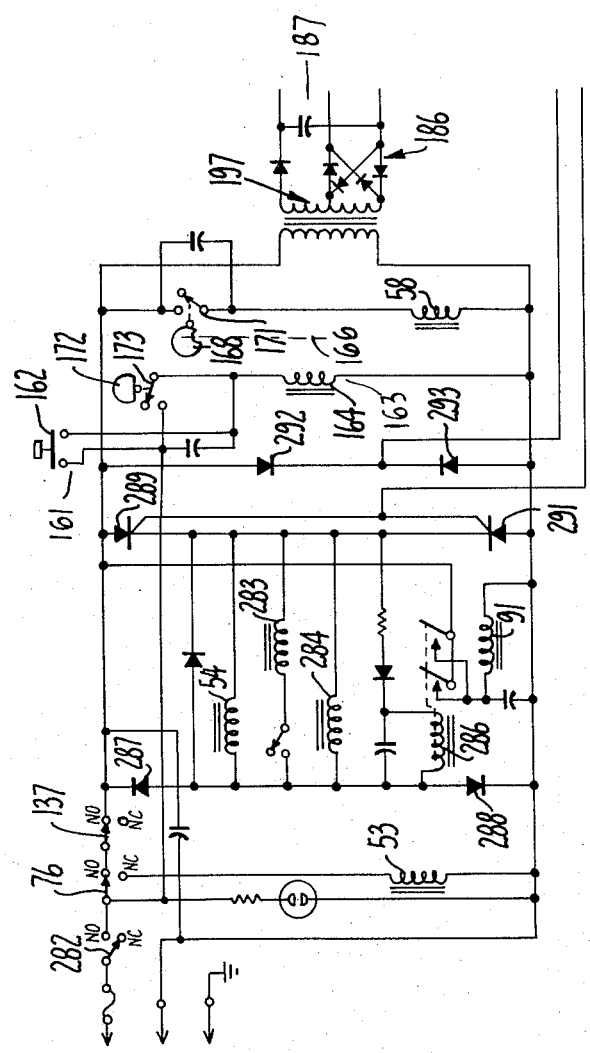

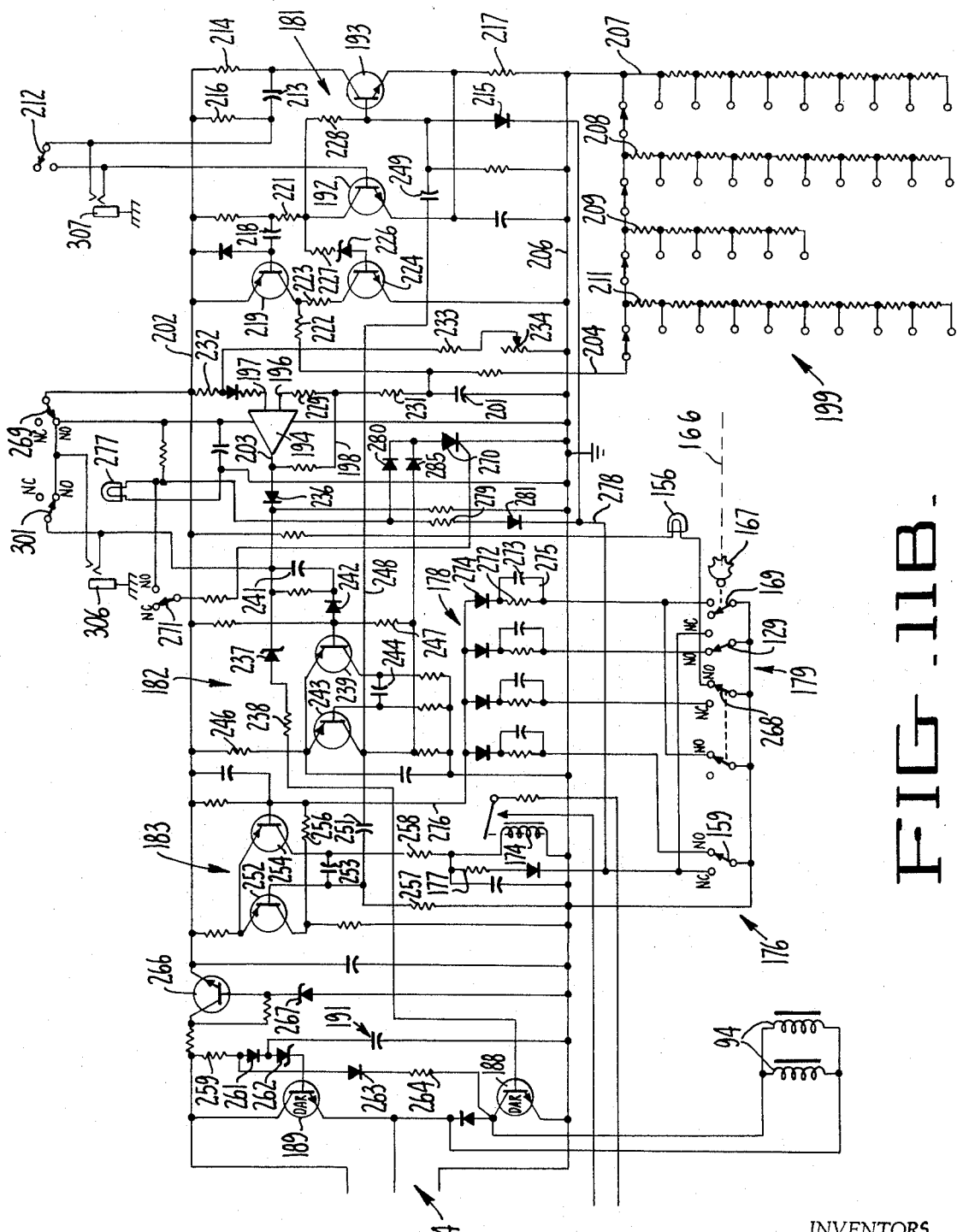

DATA RECORDING CAMERA

BACKGROUND OF THE INVENTION

This invention relates to a DATA RECORDING CAMERA, and more particularly to a camera for automatically photographing an electronic display such as an oscilloscope face.

The growing use of electronic devices in the fields of specialized medical diagnosis has led in turn to the need for photographic recording of data displayed in a transitory fashion, such as a trace on a cathode ray oscilloscope. In some instances, the recording is a vitally necessary part of the analysis of the data in the first instance, and in other cases, the recording is for preservation of the data for later use or sharing with other health professionals. For either purpose, accurate, foolproof and precisely timed automatic photographic apparatus is necessary.

Precision timing of exposure duration is vital to certain applications of such recording, such as medical scintiphotography. In such applications, the results to be derived from the photographic record depend in part upon having a sequential series of photographs which record the display of the oscilloscope screen for known time periods. Camera for such medical purposes must be virtually automatic and foolproof in their operation, as extensive photographic training is not customarily found in the persons who use them.

SUMMARY OF THE INVENTION

The camera of the present invention is virtually entirely automatic in its operation, and is interlocked and controlled to a degree which prevents accidental spoiling of the exposed film. The camera is close-coupled to the face of an oscilloscope, and contains a lens system which images the face of the oscilloscope onto the emulsion side of a portion of an initially continuous strip of film at an exposure gate. An electronically controlled shutter interrupts the light path while the film is advanced by an electronically controlled film advancing mechanism.

The timing of the shutter and the film advance is precisely controlled by an electronic control circuit which has a broad range of frame-rate selection. To simplify film handling, film is supplied from a continuous supply roll within the camera housing, and taken up in a light-tight self-threading cassette inserted through the housing and held in light-tight relation to the housing.

A counter may be set to terminate photography after a desired number of exposures, or when the takeup cassette capacity is reached. An automatic sequence control advances the last exposed frame into the cassette, severs the film adjacent to the cassette, and then releases the cassette from the housing of the camera. Since the cassette is self-threading, the operator need not handle the film at any point from start to finish, and has no opportunity to accidentally fog more than one frame of film at a time. The interlocks prevent exposure of data onto a fogged frame, and disable the film during operations likely to cause fogging.

Accordingly, it is a principal object of the present invention to provide a data recording camera of the character described having totally automatic film transport to a self-threading takeup cassette held in an automatically-releasable light-tight relation to the camera housing.

It is a further principal object of the present invention to provide a camera of the character described having precision timing of sequential exposure of the film over a broad range of selected durations.

Another principal object of the present invention is to provide a camera of the character described which prevents film advance during operations likely to fog film and automatically advances frames likely to be fogged out of the exposure gate before beginning data exposure.

A still further object of the present invention is to provide a camera of the character described having the capability of exposing written data onto the film in the exposure gate.

Further objects and advantages of the present invention will become apparent as the specification proceeds, and the new and useful features will be fully defined in the claims appended hereto.

BRIEF DESCRIPTION OF THE DRAWINGS

The preferred form of the present invention is illustrated in the accompanying drawings, in which:

FIG. 6 is a fragmentary plan view on an enlarged scale of the film advancing and cassette releasing mechanism;

FIG. 7 is a fragmentary cross-sectional elevation view taken approximately along the plane of lines 7—7 of FIG. 6;

FIG. 8 is a fragmentary cross-sectional elevation view taken approximately along the plane of lines 8—8 of FIG. 6;

FIGS. 11A and 11B are a schematic diagram of the electronic control circuit of the camera.

While only the preferred form of the present invention has been shown here, it should be understood that various changes or modifications may be made within the scope of the claims attached hereto without departing from the spirit of the invention.

DESCRIPTION OF THE PREFERRED EMBODIMENT

Figure 1:
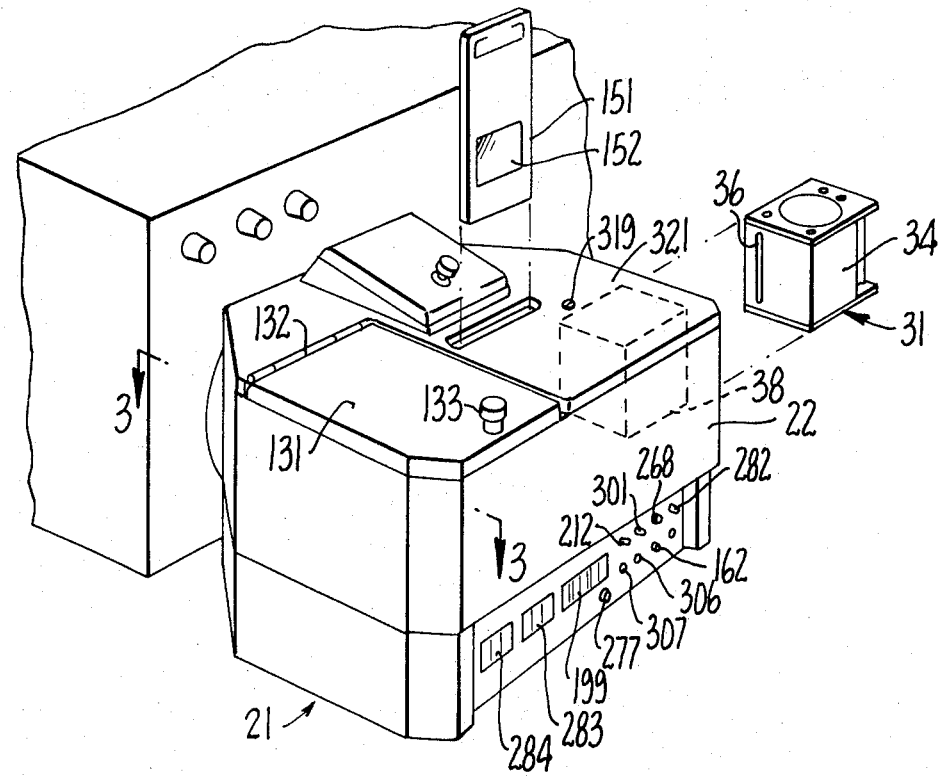
FIG. 1 is a perspective view of the camera of the present invention, attached to the face of an oscilliscope (shown in fragmentary fashion) with the cassette shown in exploded position and its receptacle shown in phantom.
Figure 2:
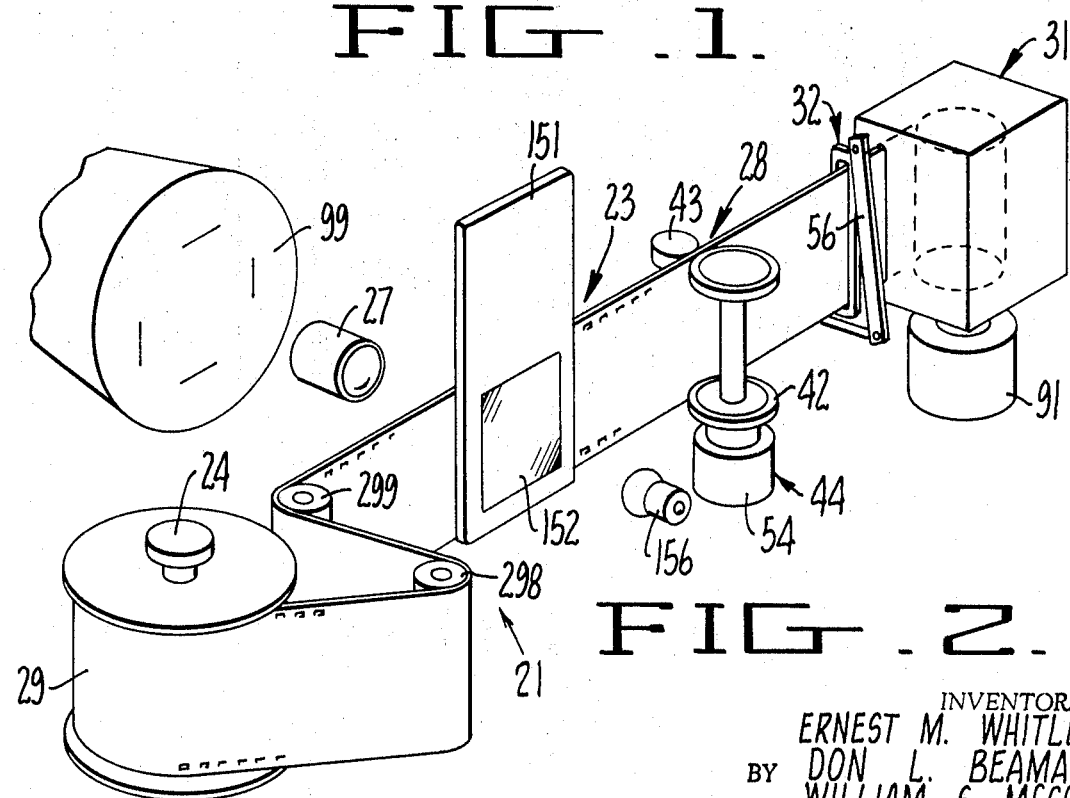
FIG. 2 is a schematic perspective view on an enlarged scale of the film path of the camera of the present invention, with parts shown broken away for clarity.

Referring to the drawings in detail and particularly FIG. 1 and 2, it will be seen that the data recording camera 21 of the present invention includes a first light-tight housing 22 having a film exposure gate 23 within the housing 22, a supply spindle 24, a shutter 26 in the housing 22 positioned to interrupt light passing from outside the housing 22 to the gate 23, and a lens system 27 in the housing 22 for imaging data at the film exposure gate 23. The camera 21 also includes a film advancing mechanism generally indicated at 28 for advancing film from a supply roll 29 on the supply spindle 24 through the exposure gate 23, a takeup cassette 31 for receiving the film after it passes through the gate 23, a film cutoff mechanism generally indicated at 32 to sever the film, and a control circuit generally indicated at 33 for controlling the operation of the shutter 26, the film advancing mechanism 28, and the cutoff mechanism 32.

The takeup cassette 31 includes a second light-tight housing 34 having a light-tight entrance slot 36 and a takeup spindle 37 journalled within the housing 34 and engageable from outside the cassette 31 for rotation. The takeup spindle 37 is adapted to grasp the strip of film and automatically roll up the film on the take-up spindle. The film cutoff mechanism 32 is located in the overall housing 22 of the camera 21 to be adjacent to the entrance slot 26 of the cassette 31 when the cassette 31 is inserted into the recess 38 which receives the cassette 31 within the housing 22. Thus the severing of the film by the film cutoff mechanism 32 occurs in the vicinity of the entrance slot of the cassette, and only a short tab of film projects out of the entrance slot of the cassette 31 after the cassette has been ejected from the camera.

The takeup cassette 31 fits closely within the recess 38 so that the film is received from the first housing 22 into the cassette 31 without exposing the film to light. A release mechanism generally indicated at 39 retains the cassette 31 in the recess 38 at those times when it is desired to receive film into the cassette 31 from the camera 21 and automatically releases the cassette 31 from the recess 38 after the film cutoff mechanism 32 has operated. An exit slot 41 is formed in the housing 22, positioned to be juxtaposed with the entrance slot 36 of the cassette 31 when the cassette 31 is fully inserted into the recess 38, so as to maintain the light-tight relation between the housing 22 and the cassette 31.

The film advancing mechanism 28 includes a drive roller 42 disposed adjacent the path of the film through the camera 21 downstream of the exposure gate generally indicated at 23, an idler roller 43 disposed adjacent the film path opposite the drive roller 42 in confronting relation to the periphery of the drive roller 42, and a drive mechanism 44 connected to the drive roller 42 for rotating the drive roller 42 to advance the film. The film advancing mechanism 28 also includes a retraction mechanism generally indicated at 46 connected between the drive roller 42 and the idler roller 43.

Figure 3:
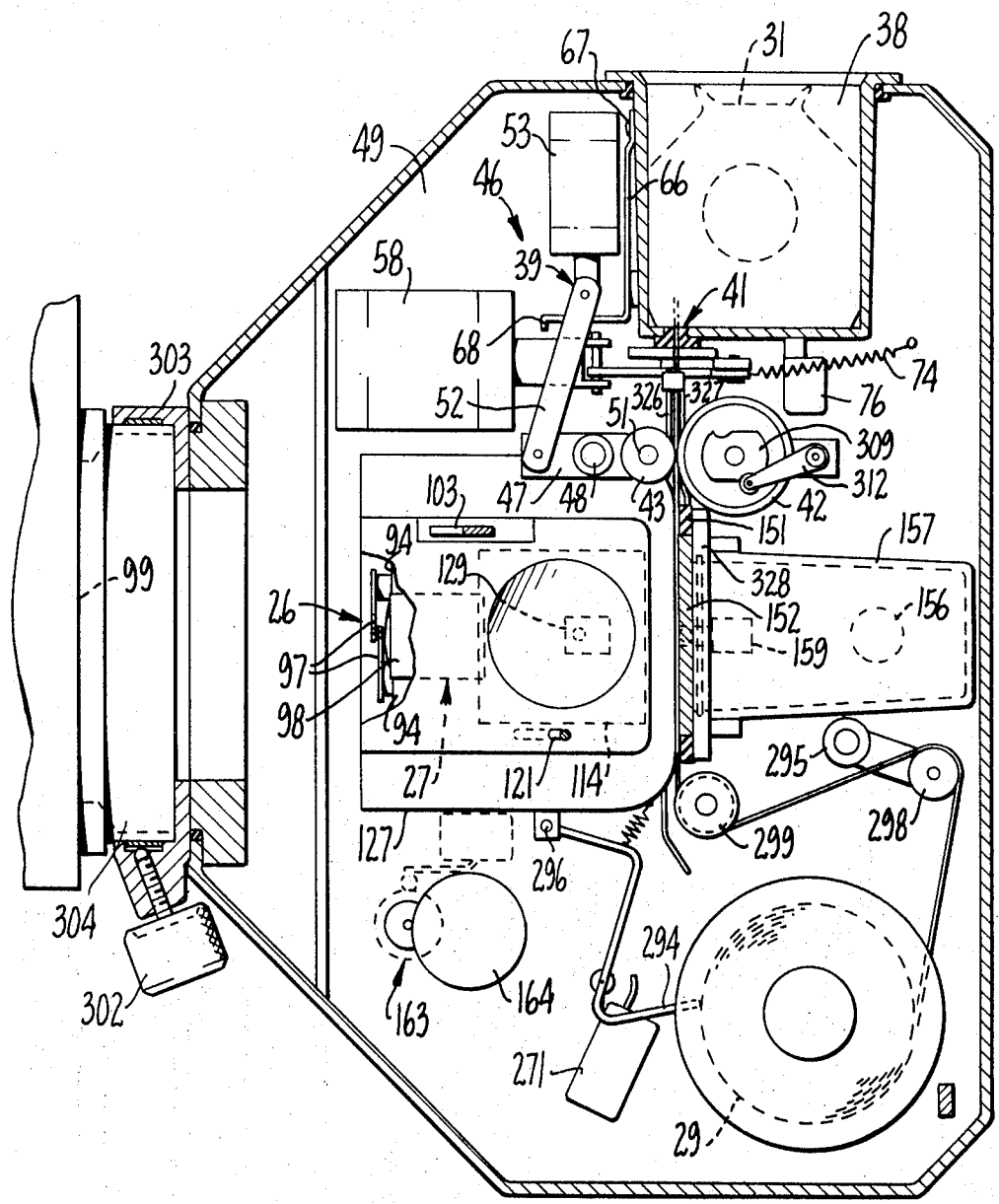
FIG. 3 is a plan cross-sectional view on an enlarged scale taken approximately along the plane of lines 3 — 3 of FIG. 1 showing the cassette in phantom.

The retraction mechanism 46 operates to move the drive roller 42 and the idler roller 43 relative to each other into and out of confronting relation, and includes a lever arm 47 mounted about a pivot 48 which is in turn attached to the chassis 49. The lever arm 47 bears the idler roller 43 at one end, mounted for freedom of rotation about an axle 51, and has a connecting link 52 pivotally connected to the opposite end. The connecting link 52 connects the lever arm 47 to a linear motion retraction solenoid 53 mounted on the chassis 49. The small directional arrow leading arcuately downward from the axle 51 in FIG. 3 shows the retraction of the solenoid 53 will cause pivotal motion of the idler roller 43 about the pivot 48 in such a manner as to move it away from the drive roller 42. Alternatively of course the drive roller and its drive mechanism 44 could be mounted to be moved relative to the chassis 49 by the retraction solenoid 53. The drive mechanism 44 is shown here as a rotaty-motion type solenoid 54.

The film cutoff mechanism 32 includes a knife blade 56 disposed along one side of the path of the film, a shear plate 57 disposed on the opposite side of the film path to cooperate with the knife blade 56 in shearing the film, and a solenoid actuator 58 attached to the knife blade 56. The solenoid actuator 58 is supplied with operating current from the control circuit 33. The knife blade 56 is pivotally mounted on a pin 59 mounted on the shear plate 57. The end of the knife blade 56 opposite the pivot 59 is pivotally attached to an operating link 61, and the operating link 61 is in turn pivotally attached by a pin 62 to a yoke 63 mounted on the moving arm 64 of the solenoid 58. Thus the retraction of the movable member 64 of the solenoid 58 to the position shown in phantom in FIGS. 6 and 7 operates to drive the knife blade 56 past the shear plate 57 As indicated by the arrows in those Figures to the position shown in phantom in those figures, to sever the film.

As the movable member 64 nears its fully retracted position as shown in phantom in FIG. 6, a lateral extension of the pin 62 triggers the release mechanism 39 to release the cassette 31 from the recess 38 in the housing 22. The release mechanism 39 includes an elongated spring member 66 having one end fixed to a portion of the chassis 49 such as the outside of one of the walls of the recess 38 as indicated at 67, and having the opposite or distal end formed into a projection 68 positioned to be caught by the pin extension 62 upon retraction of the yoke 63 to the position shown in phantom in FIG. 6. A latch member 69 is fastened to that portion of the spring member 66 which lies adjacent the wall of the recess 38 and extends through a cushion member 71 and an aperture 72 in the wall of the recess 38 to engage a depression 73 formed in one wall of the cassette 31 to retain the cassette 31 in the recess 38.

When the spring member 66 is moved to the position shown in phantom in FIG. 6 by the retraction of the yoke 63 and the movable member 64 causing the pin 62 to strike the projection 68, it may be seen that the latch member 69 is retracted out of engagement with the depression 73 in the wall of the cassette 31 to release the cassette. When the solenoid 58 is deenergized the knife blade 56 is returned to the position shown in solid lines in FIG. 7 by a return spring 74. A micro switch 76, which may be seen most clearly in FIG. 6, senses the presence or absence of the cassette 31 in the recess 38 for interlock purposes in connection with the control circuit 33 described below.

Figure 9:
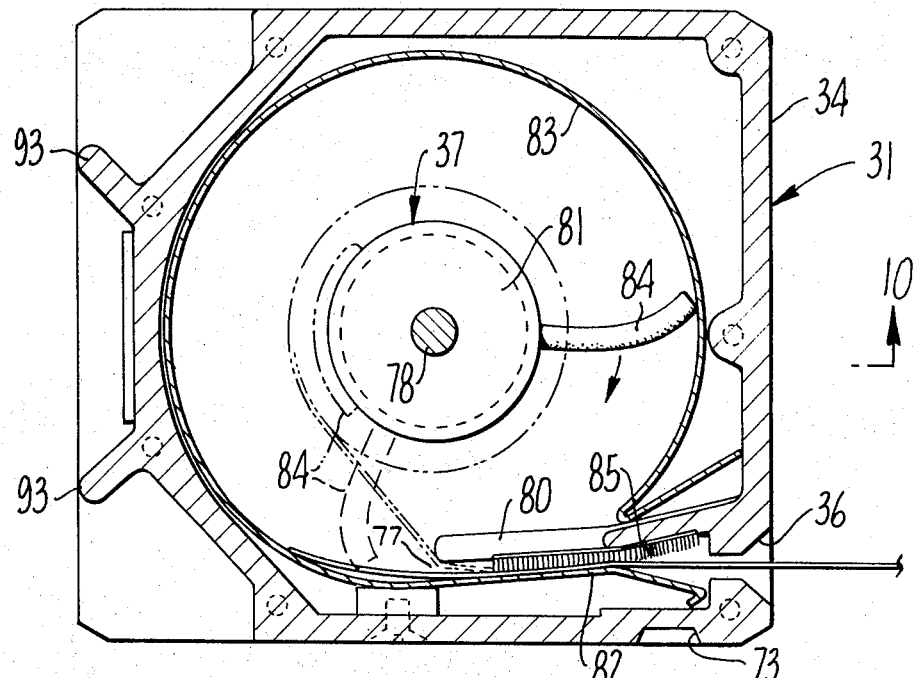
FIG. 9 is a plan cross-sectional view on an enlarged scale of the cassette.
Figure 10:
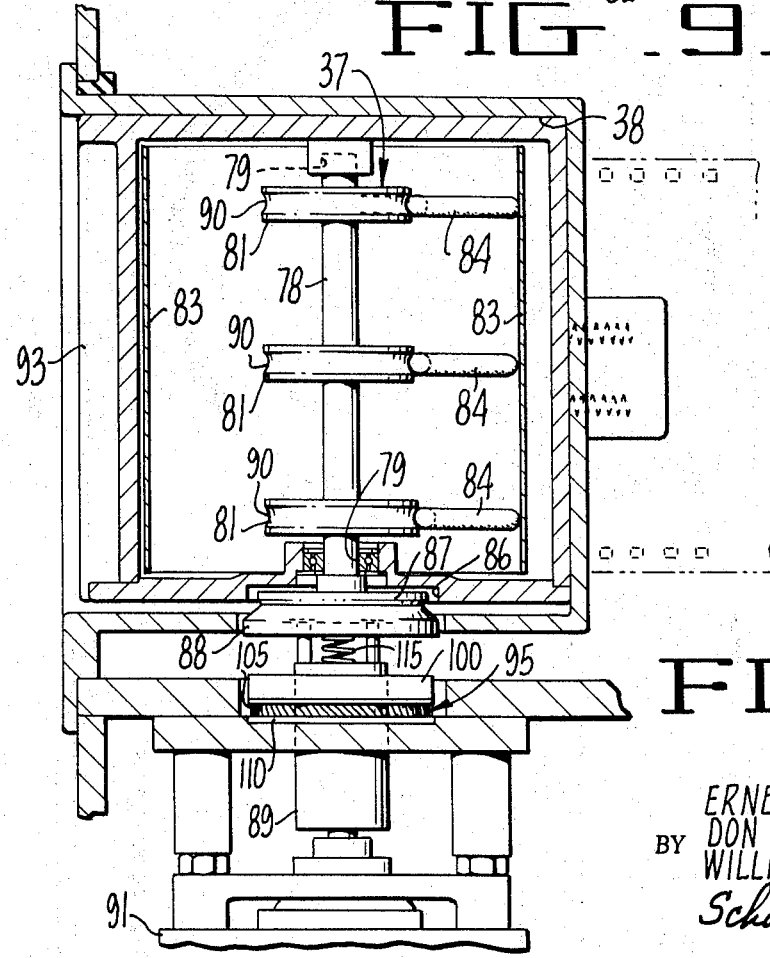
FIG. 10 is an elevational cross-section view on an enlarged scale taken approximately along the plane of lines 10—10 of FIG. 3, showing the cassette in place.

Turning now to the cassette 31 and the takeup drive mechanism, as shown in greater detail in FIGS. 9 and 10, the cassette 31 has a basically rectangular light-tight housing 34, with the entrance slot 36 adjacent one edge of a face of the housing 34. The entrance slot 36 is closed off by a light trap 77 formed by a fixed inner wall 80 faced with a strip 85 of material such as plush or velvet and one end 82 of a spring band member 83 which circles the interior of the cassette 31 and extends from top to bottom of the cassette as seen in FIG. 10.

The trap makes a relatively low friction wiping contact with the film to exclude light from passing into the interior of the housing 34 through the entrance slot 36. The takeup spindle 37 is journalled within the housing 38 by having its axle 78 carried in bearings 79 mounted on the top and bottom of walls of the housing 34.

The axle 78 has fixed to it three axially spaced disc members 81 about whose circumference the film is to be wound up. Each of the disc members 81 has a protruding finger-like member 84 formed of flexible material with a high coefficient of friction, such as silicone rubber, attached to it to extend outward approximately radially into contact with the spring band member 83. The ends of the fingers 84 wipe along the inside of the band 83 and in their rotation encounter the inner surface of the entering strip of film. Frictional engagement of the fingers 84 with the film strip causes the inner turns of the coil of film to be coiled in a tightening spiral around the spindle as the spindle 37 is rotated until several turns of film have been taken up firmly around the discs 81 and the fingers flattened down to conform approximately to the circumference of the discs. A peripheral groove 90 in each of the discs 81 accommodates the flattened fingers 84. The spring band member 83 ensures that the film will follow a circular path around the spindle without hanging up to interior portions of the cassette 31.

The axle 78 passes through the lower wall of the housing 34 and into a well 86 in that lower wall. A coupling disc 87 is fixed to the axle 78 to rotate within the well 86, and is engaged by a driving member 88 affixed to the end of the drive shaft 89 of a torque motor 91 mounted on the chassis 49. The driving member 88 has a bevelled upper edge and is biased upward toward the disk 87 by a spring 115 to allow the coupling disk 87 to be slipped out of engagement with the driving member 88 as the cassette 31 is removed from the recess 38.

The cassette drive system is equipped with a one-way clutch 95 acting between the drive shaft 89 and the chassis 49 to which the motor 91 is mounted, to prevent the unwinding of film from the spindle 37 when the motor is not energized, due to the spring tension of the film rolled up on the spindle. The clutch 95 permits clockwise motion of the shaft 89 (and hence also the spindle 37) as seen in FIG. 9, while resisting counterclockwise motion which would tend to allow the film to unroll from the spindle. The clutch 94 is formed by an adjustable collar 100, carried on the shaft 89 and faced on its lower side with a clutch material forming an annular clutch face 105. A matching annular portion of a complementary clutch material forms a second clutch face 110 on the motor mounting, part of the chassis 49.

The materials of the two clutch faces are adapted to slip against each other in one direction of rotation, and to resist slippage in the opposite direction of rotation. Materials known by the trademark Fibre-Tran and manufactured by Minnesota Mining and Manufacturing Company may be used to construct the two clutch faces having the desired properties. The first clutch face 105 is made from Fibre-Tran fiber-faced material, and the second clutch face 110 is made from Fibre-Tran screen material. The fiber-faced material has numerous projecting fibers which are so set into the backing as to lie flat in one direction of circular motion, and to move up away from the backing material when subjected to the opposite rotary motion. The Fibre-Tran screen material allows the fibers of the Fibre-Tran fiber-face material to slide over its surface when the fibers of the fiber-face lie flat, and engages the fibers to cause them to rise up and impede motion when the fiber face is oppositely rotated. The effect is that of a multiple-sprag miniature one-way clutch. The collar 100 is held by a set screw and may be moved along the shaft 89 to adjust the clutch tension.

Rotation of the drive shaft 89 of the torque motor 91 thus communicates rotation to the takeup spindle 37 within the housing 34 of the cassette 31. The torque motor 92 is operated in unison with the film advancement mechanism 28, and is arranged to operate at a speed sufficient to roll up one frame width of film during the film advancement motion, when the spindle 37 is at its minimum effective diameter. As film buildup on the spindle 37 increases its effective diameter, excess rotation of the motor 91 is relieved by slippage between the coupling disc 87 and the driving member 88.

Ejection of the cassette 31 from the recess 38 is assisted by a spring means 92 mounted in the rear wall of the recess 38 and applying an outward spring bias to the cassette 31. The cassette tends to move to the left as seen in FIG. 10 once the latch member 69 is withdrawn from the recess 73. The outermost portion of the wall of the housing 34, that is the wall opposite the wall having the entrance slot 36, is formed with a pair of rib members 93 which may be manually grasped to assist in handling or removal of the cassette 31 from the recess 38 should this be necessary.

Figure 4:
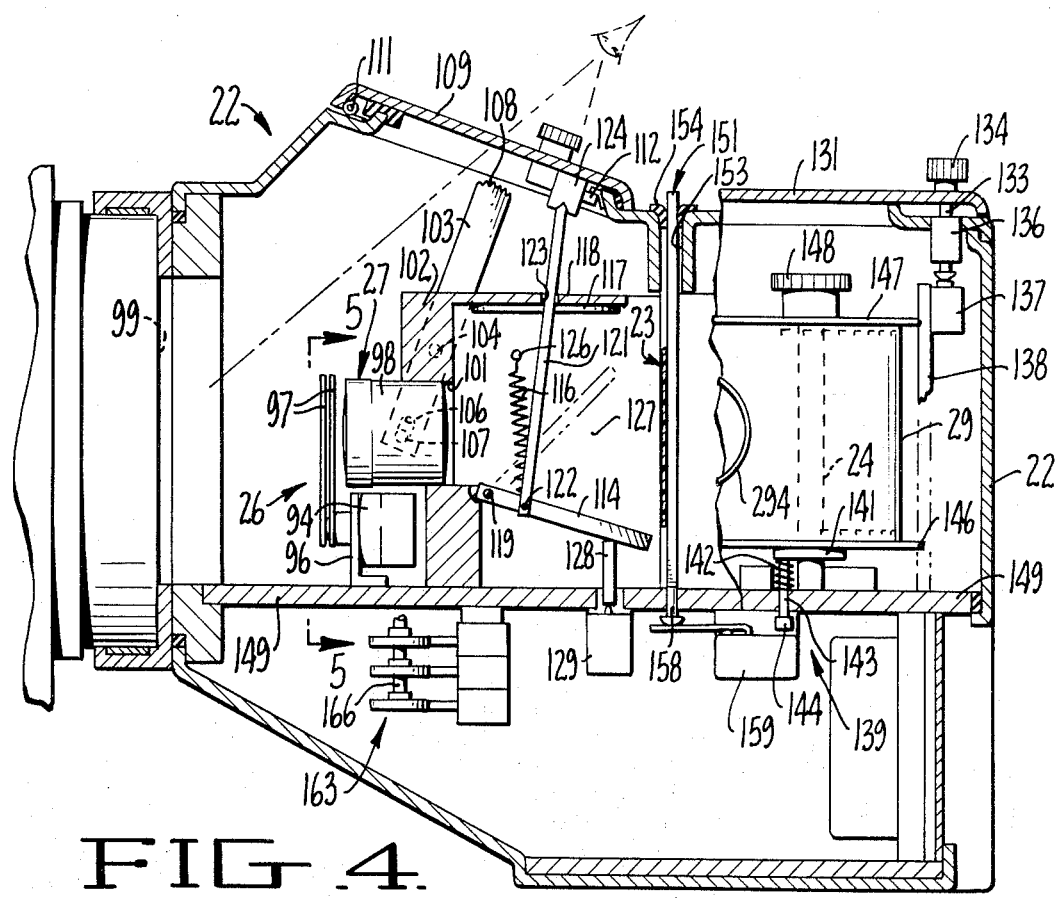
FIG. 4 is an elevational cross-section view with portions broken away, taken approximately along the plane of lines 4 — 4 of FIG. 3.
Figure 5:
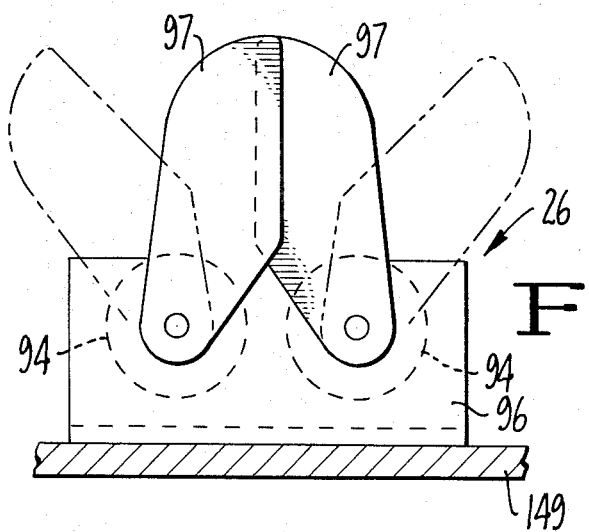
FIG. 5 is a fragmentary elevational view on an enlarged scale of the shutter taken approximately along the plane of lines 5—5 of FIG. 4.

The shutter 36 may be seen in FIG. 3, 4 and 5 and includes a pair of rotary motion solenoids 94 mounted to the chassis 49 by a bracket 96. Attached to the output drive shaft of each of the rotary motion solenoids 94 is a shutter leaf member 97. The two shutter leaf members 97 are formed as mirror images of each other, and as may be seen in FIG. 5, they coact when rotated toward each other to block passage of light into the lens system 27 from outside the camera. The two rotary solenoids 94 are selected for rotation in their actuated state in directions opposite to each other, so that when energized they rotate to move the shutter leaves 97 apart as shown in the phantom lines of FIG. 5. When deenergized, each rotary motion solenoid 94 rotates in the direction opposite to the other to bring the leaves 97 together to the position shown in solid lines in FIG. 5, blocking passage of light.

The lens system 27 includes a multi-element positive lens, shown here in a merely schematic form, the selection of an appropriate lens of the desired focal length being a matter well understood in the art. The lens 98 is adapted to be focused to image the data produced at the face 99 of the oscilloscope onto the film at the film exposure gate 23. The lens 98 is journalled for axial motion in a bore 101 formed in a lens mounted block 102, which is mounted in turn on a portion of the chassis 49. Appropriate friction members (not shown), such as spring-loaded nylon buttons, are mounted in the block 102 to bear on the lens 98 to restrain it from unwanted motion.

A focusing lever 103 is pivotally mounted on the block 102 by a pin 104 and is formed with a slot 106 at its lower end. The slot 106 is engaged in turn with a pin 107 mounted on the body of the lens 98. The slot 106 and the pin 107 form a lost-motion connection which allows the pivotal motion of the focusing lever 103 to be translated into axial motion of the lens 98 within the bore 101. The upper end 108 of the focusing lever 103 may be serrated for engagement by the operator's finger to move the lens 98 back and forth during the focusing process.

A door 109 in the housing 22 provides access to the lens system 27. The upper end of the door 109 is hinged as at 111, and the lower end of the door is equipped with a latch 112 which may be operated by a knob 113 to open the door 109. The opening of the door 109 permits the operator to view the face 99 of the oscilloscope and to focus the lens system 27 by the focusing lever 103. A focusing mirror 114 is raised to the position shown in phantom lines in FIG. 4 by a spring 116 upon the opening of the door 109. The upraised mirror 114 diverts the image formed by the lens 98 to a focusing screen 117 mounted on a bracket 118 extending from the lens mounted block 102. The focusing screen 117 may be formed of any appropriate translucent material and is positioned as is well understood in the camera art to lie at exactly the same optical distance from the rear of the lens 98 as the plane of the film gate 23.

The mirror 114 is pivotally attached to the rear of the lens mounting block 102 by a pin 119, and is forced downward against the tension of the spring 116 when the door 109 is closed, by a link member 121. The link member is pivotally attached to the mirror 114 by a pin 122 at one side of the mirror 114 and passes upward through a slot 123 in the bracket 118 to bear against the bracket 124 attached to the door 109. As shown here, the spring 116 extends between a pin 126 attached to the side wall of the lens enclosure 127 and a point on the opposite edge of the mirror 114 corresponding to the location of the pin 122.

When the mirror 114 is pushed fully down to the position shown in solid lines in FIG. 4 by the action of the door 109 on the link 121, the back of the mirror 114 bears against an actuating rod 128, which bears in turn on a microswitch 129. The microswitch 129 is connected to the control circuit 33 to provide an interlock function based on the position of the mirror 114. This interlock function prevents the operation of the film advancing mechanism 28 while the door 109 is open and the mirror 114 is up, in order to prevent the fogging of more than one frame of film in the exposure gate 23. The reclosure of the door 109 lowers the mirror to trip the microswitch 129, which then operates to cause the control circuit 33 shown generally in FIGS. 11a and 11b to operate the film advancement mechanism 28 and remove the fogged frame of film from the film gate 23 and bring up a fresh frame of film.

To the left rear of the housing 22 as shown in FIG. 1 is located a second door 131 having a hinge 132 and a latch member 133 similar to the latch member 112, operated by a finger knob 134. The door 131 closes off the film supply compartment housing the supply roll 29 on the spindle 24. The opening of the door 131 operates an actuating link 136 which bears in turn on a microswitch 137 attached to a bracket 138 adjacent to the film supply spindle 24. The microswitch 137 is connected to the control circuit 33 as described below to disable the camera when the door 131 is open.

The camera 21 also includes a brake mechanism generally indicated at 139. The brake mechanism 139 includes a ring-shaped friction plate 141 surrounding the supply spindle 24 at its lower end and bearing against the bottom flange 146 of the supply roll 29. The friction plate 141 is biased against the bottom flange 146 by a compression spring 142 which extends between the friction plate 141 and the chassis plate 149 which forms a part of the chassis 49. The spring 142 is guided by a retaining rod 143 which also serves to guide the friction plate 141 and to retain it against removal from the supply spindle 24. The retaining rod 143 passes through an aperture in the plate 149 and is formed with a knob 144 on its end below the plate 149 to retain it against removal. The opposite end of the rod 143 may be threadably engaged with the friction plate 141. The supply spool 29 is secured on the spindle 24 in resilient engagement with the friction plate 141 by a retaining nut 148 threaded onto the supply spindle 24 and bearing against the upper flange 147 of the supply spool 29.

The camera 21 also includes a data card or slate generally indicated at 151, formed as a generally rectangular card-like member having a transparent area 152 on which data may be written for transfer to the film in the film gate 23. As may be seen from FIGS. 3 and 4, the data card 151 lies immediately behind the plane of the film in the gate 23 and thus serves as a backing plate to insure flatness of the film at the gate 23. The data card slides in and out of a slot 153 in the housing 22 of the camera 21, and the slot is closed off against intrusion of stray light when the card is fully inserted by a light trap seal 154 formed of resilient material surrounding the slot 153.

When it is desired to impress the data from the transparent area of the data card 151 onto the film, a lamp 156 shown schematically in FIG. 2 and in phantom in FIG. 3 is energized to "contact print" the data written on the transparent area 152 onto the back side of the film in the film exposure gate 23. The data from the data card 151 is not impressed on the film in the gate 23 unless the lamp 156 is energized, as the lamp 156 is enclosed within a light-tight housing 157 within the housing 22 of the camera.

The full insertion of the data card 151 into the slot 153 deflects a button 158 mounted in the plate 149, and the button 158 in turn deflects the actuating arm of a microswitch 159 connected to the control circuit 33. The microswitch 159 operates in the control circuit in a fashion similar to the microswitch 129 on the mirror interlock, to prevent advancement of film through the gate 23 while the data card is removed and stray light can enter through the light trap 154, and also to advance the potentially fogged frame of film out of the exposure gate 23 upon reinsertion of the data card 151.

The control circuit 33 includes among its functions a cut release generally indicated at 161 in FIG. 11A. The cut and release circuit includes a manually actuable switch means 162 for initiating a sequence of operations leading to the ejection of the cassette 31 from the housing 22 of the camera, and a cycling mechanism generally indicated at 163, which first causes the film advancing mechanism 28 to advance a predetermined length of the film through the film exposure gate 23 in the housing 22 and into the cassette 31, and then triggers the cutoff mechanism 32 after the predetermined length has been advanced into the cassette. The release mechanism 39 then releases the cassette 31 from the recess 38 in response to the operation of the film cutoff mechanism 32.

The cycling mechanism 163 includes a timer drive motor 164 which is actuated by current supplied through the manually actuable switch means 162 and has an output drive shaft 166. A first cam means 167 and a second cam means 168 are borne on the drive shaft 166, and a first cam-actuated switch means 169 and a second cam-actuated switch means 171 have their respective followers actuated by the first and second cam means 167 and 168 respectively. The first cam means 167 and the second cam means 168 are so phased on the drive shaft 166 that they operate to actuate the first switch means 169 before second switch means 171. The first switch means 169 is connected to the control circuit 33 to trigger operation of the film advancing means 28 and the second switch means 171 is connected to the control circuit 33 to trigger operation of the film cutoff means 32.

As shown in the resent embodiment, the first cam means 167 actuates the first switch means 169 a plurality of times before the second cam means 168 actuates the second switch means 171 to sever the film. The number of times that the film is advanced before being severed is selected so that the last frame of film exposed to the data in the film exposure gate 23 is moved through the film within the camera to a point within the takeup cassette 31 before the film is severed. In the preferred embodiment this amounts to four advancements of the film, and hence the film cam means has four actuating areas on its circumference to trip the first cam-actuated switch 169 four times and advance the film four times before the second cam-actuated switch 171 is tripped to sever the film.

The drive shaft 166 also carries a third cam means 172 which engages the follower of a third cam-actuated switch means 173. The third cam actuated switch means 173 supplies current to the timing drive motor 164 in parallel with the manually actuable switch 162, so that its closure by the third cam means 172 acts to lock in the timer drive motor 164 to complete one full cycle of rotation of the first, second and third cam means. To do this, the third cam means 172 is formed to actuate the switch 173 during a major part of the rotation of tis circumference, so that the closure of the manual switch 162 for a brief period will cause sufficient rotation of the drive shaft 166 to allow the third cam 172 to close the third switch and thereby ensure rotation for a full turn of the shaft 166. The rotation of the third cam 173 around to its relieved portion again causes the third switch 173 to open, and if the manual switch 162 is not closed at that time, the timer drive motor 164 will stop.

The film advancing mechanism also includes an actuating device, shown in FIG. 11B as a relay 174. Although a relay 174 is shown, the actuating device could also be the rotary motion solenoid 54 itself or any other electrical device capable of switching current to the film advancing solenoid 54 which would be susceptible to being disabled by having a low resistance placed in parallel with it.

The camera 21 includes a anti-advance interlock circuit formed by a switch means generally indicated at 176 and low resistance 177 in series with the switch means 176. The switch 176 and the low resistance 177 together are in parallel with the power supply to the actuating device, that is, in the present embodiment, the driving coil of the relay 174. The closure of the switch means 176 thus operates to place the low resistance 177 in shunt with the coil of the relay 174, to reduce the current flow through the relay coil to a point below the pull-in current so that the relay 174 will not be operated when energized by the control circuit 33.

The switch means 176 is activated by a movable portion of the camera 21, the movable portion being selected to be one whose movement is indicative of a condition in the camera during which advancement of the film by the film advancement means 28 should be blocked. Microswitches 129 and 159 described above are examples of switches in the camera attached to movable portions of the camera, the mirror 114 and the button 158 respectively, to serve as the switch means generally indicated at 176.

The control circuit 33 also includes an automatic forced advancement circuit generally indicated at 178 in FIG. 11B. The forced advancement circuit 178 includes a switch means generally indicated at 179, activated by a movable portion of the camera 21. The movable portion is one so chosen as to be moved during the reclosure of a portion of the camera 21, the opening of which might tend to fog the film in the exposure gate 23. The fogged portion of the film will thereby be advanced out of the film gate upon the closure of the portion of the camera which fogged it. Such movable portions include the mirror 114 which is moved by the link member 121 which bears on the viewing door 109, and the button 158 which is moved by the insertion of the data card 151. Thus it may be seen that the functions of the switch means 179 are served in the present embodiment in part by the same microswitches 129 and 159 which served in the role of the switch means 176. The operation in electrical terms of the forced advancement circuit 178 in connection with the control circuit 33 is described below in connection with the details of the description of the control circuit.

Turning now to the control circuit 33 as schematically shown in FIGS. 11A and 11B, the control circuit 33 includes a timing circuit generally indicated at 181, which is essentially a multivibrator having first and second states and producing a first output signal when in the first state and a second output signal when in the second state, first delay circuit generally indicated at 182 triggered by the first output signal of the multivibrator in the timing circuit 181 and operative after a selected delay to produce an output signal to trigger operation of said film advancing mechanism and to reset the multivibrator to the multivibrator's second state, a second delay circuit generally indicated at 183 triggered by the output signal of the first delay circuit 182 and operative to first actuate the film advancing mechanism 28 in response to the output signal of the first delay circuit 182 and then to terminate that actuation after a selected delay, and a shutter control circuit generally indicated at 184, responsive to the first output of the multivibrator in the timing circuit 181 to close the shutter 26 and responsive to the second output of the multivibrator to open the shutter.

The shutter control circuit generally indicated at 184 includes a first power supply 186 supplying a first voltage, a second power supply generally indicated at 187 supplying a second voltage higher than the first voltage, a first transistor 188 having its emitter and its collector connected in series with the supply of electrical power from the first power supply 186 to the shutter 26 and its base connected to respond to the issuance of the first and second output signals from the multivibrator of the timing circuit 181, a second transistor 189 having its emitter and collector connected in series with the supply of electrical power from the second power supply 187 to the shutter 26 and its base connected to the first transistor 188 so that base drive is supplied to the second transistor 189 upon conduction in the first transistor 188, and a delay means generally indicated at 191 interposed in the circuit which supplies the base drive to the base of the second transistor 189, effective to terminate the drive for the second transistor 189 a selected interval after the drive for that transistor is begun.

By this arrangement of the shutter control circuit 184, a higher voltage is supplied to the shutter 26 to initiate its opening and a lower voltage is subsequently supplied to the shutter to maintain it open. Rapid opening of the shutter 26 may thus be achieved by initially applying a high voltage which the shutter driving solenoids 94 could not withstand on a continuous basis and then supplying the lower voltage at a level effective to maintain the opening without overloading the coils of the chutter solenoids 94.

The timing circuit or multivibrator 181 includes a pair of cross-connected transistors 192 and 193, an operational amplifier integrated circuit device 194 having first and second input lines 196 and 197 respectively and a positive feedback loop generally indicated at 198, connected from the output of the operational amplifier 194 to the input 196, and a resistor-capacitor time delay circuit formed by a variable resistance generally indicated at 199 and a capacitor 201. The resistor-capacitor circuit supplies drive to the first input 196 of the operational amplifier 194, and the second input 197 is coupled to the source of direct current, that is, the positive d.c. bus 202, to create a reference level in the operational amplifier 194. The operational amplifier 194 is thus being operated essentially as a differential amplifier comparing the relative state of the inputs 196 and 197 and producing a high-level output signal when the input signal at the input 196 is higher than the input signal at the input 197.

The capacitor 201 is charged in response to the second state of the flip-flop formed by the transistors 192 and 193 and is discharged through the variable resistor generally indicated at 199. The discharge of the capacitor 201 reduces the drive supplied to the first input 196 of the operational differential amplifier 194 below the level of the input on the second input line 197, causing the differential operational amplifier 194 to shift from a high level output (the second output signal) to a low level output (the first output signal) on its output line 203. The operational differential amplifier 194 thus produces a second, or high level output signal so long as the capacitor 201 is charged to a level above the level supplied to the second input 197 of the amplifier 194. The duration of this time is selected by the variable resistor generally indicated at 199, and the high level or second multivibrator output signal on the output line 203 is communicated to the shutter control circuit 184 to govern the opening of the shutter 26.

The variable resistance 199 is shown here as being a series of decade-arranged series resistances connected to a series of multi-pole switches to offer a broad range of step-selected total resistance between the line 204 and the ground bus 206. Since the total resistance of the resistance 199 governs the time of decay of the charge on the capacitor 201 and thus the duration of the high level output signal on the output 203 of the differential amplifier 194, which is in turn communicated to the shutter control circuit 184, the individual settings of the switches in selecting the resistances in the steps within the variable resistance 199 effectively selects the duration of the open phase of the shutter 26.

In the present embodiment the chain of resistors and switch designated as 207 operates to add one-tenth second increments of time to the shutter opening duration, the group designated as 208 adds 1 second increments to the shutter open duration, the group designated 209 adds 10 second increments to the duration, and the group designated 211 adds one minute increments to the duration, so that the overall variable resistance 199 permits selection of shutter open duration in a range from 1/10 second to 9 minutes, 59 and 9/10 second in 1/10 second steps.

The operation of the camera is begun by closing the switch 212, thereby supplying base drive to the transistor 192 of the multivibrator by the charging of the capacitor 213 via the resistors 214 and 217. The conduction of the transistor 192 provides a ground path via the resistor 217 for charging a capacitor 218 through the resistance 221. The charging of the capacitor 218 provides base drive to the transistor 219 until the capacitor 218 is fully charged, and during the time base drive is provided, the transistor 219 conducts. The conduction by the transistor 219 provides a path supplying charging current to the main timing capacitor 201 via the resistor 222. Thus, in operation, the main timing capacitor 201 is quickly charged via a low resistance path during the time that the capacitor 218 is being charged via a path of higher resistance.

To time the operations of the camera, the master timing capacitor 201 is discharged via the resistance decade 199, so that the time for discharge is precisely regulated by the series of increments of resistance chosen by the settings of the multi-pole switches in the decade 199. A second discharge path is provided for the capacitor 201 via the resistor 223 and the transistor 224. This second discharge path operates when the transistor is cut off, to dump any remaining charge on the main timing capacitor 201. In the normal cycling of the timing circuit, such dumping is not required, but it becomes desirable when the operation of the camera is interrupted, as by the opening of the switch 212.

The opening of the switch 212 breaks the path for the supply of base drive to the transistor 192, and the ending of conduction in the transistor 192 raises the level of the base of the transistor 224, causing conduction through the transistor 224 to dump any charge remaining on the capacitor 201. The same drop in potential which provided base drive to the transistor 219 on conduction of transistor 192 causes cutoff of the transistor 224 via the zener diode 226 and the resistor 227, to block the second discharge path and allow charging of the capacitor 201 and its discharge via the first discharge path, the decade resistance 199.

The flip-flop action of transistors 192 and 193 is provided by the connection of the base of transistor 193 to the collector of the transistor 192 through the resistor 228. The potential of the base of the transistor 193 is thus lowered by conduction of the transistor 192, and the transistor 193 is thereby held in cut-off condition.

The first input 196 of the operational amplifier 194 is connected to the main timing capacitor 201 through the resistors 229 and 231, and the second input 197 of the operational amplifier 194 is connected to the positive bus 202 and the ground bus 206 by a voltage divider formed by the resistors 232, 233 and the variable resistor 234. A voltage level at the second input 197 is selected by the setting of the variable resistor 234, and that level is compared by the operational amplifier to the voltage level set by the state of charge of the main timing capacitor 201. The operational amplifier 194 responds to the presence of a higher level of input at the first input 196 from the capacitor 201 than the level of the second input by producing high output level on the output line 203.

The high output on line 203 is communicated through the diode 236, the zener diode 237 and the resistor 238 to the base of the first transistor 188 in the shutter control circuit 184. At the base of the transistor 188, the high level signal provides base drive to the transistor and drives it into conduction. Conduction of the transistor 188 provides driving current to the rotary solenoids 94 which operate to open the shutter 26. The zener diode 237 discriminates between the low and high level outputs of the operational amplifier 194 on the output line 203, so that the low level output is not passed to the transistor 188, where it could trigger conduction of that transistor.

Once the charge on the main timing capacitor 201 has decayed so that the level at the first input 196 is below that present at the second input 197, the operational amplifier 194 snaps into the condition providing a low-level (the first output signal of the multivibrator) output on the line 203. This amounts to a negative-going pulse on that line, which triggers conduction in the transistor 239 via the capacitor 241 and the diode 242, as well as terminating conduction in the transistor 188 of the shutter control circuit 184 to cause the shutter to close.

A transistor 243 is paired with the transistor 239 to form the first delay circuit 182. The transistor 243 is held in a cut-off state by the charge on a capacitor 244 connected between the base of the transistor 243 and the collector of the transistor 239. Once the transistor 239 begins conduction, this charge is drained via the emitter of the transistor 239 and the resistance 246 to the positive bus 202, so that after a length of time determined by the capacitor 244 and the resistance 246, the transistor 243 is no longer cut off, and begins conduction. Conduction in the transistor 243 raises the level of its collector, and thereby, through the resistor 247, the level of the base of the transistor 239, cutting off conduction in the transistor 239.

The increased level at the collector of the transistor 243 acts as the input signal to the second delay circuit 183, and as the reset signal to the timing circuit 181, and is communicated to both along the signal line 248. Within the timing circuit 181, the signal line communicates the positive signal to the base of the transistor 193, to drive that transistor into conduction. The conduction of the transistor 193 drains the charge from the capacitor 213, so that base drive will be provided to the transistor 192 by the recharging of the capacitor 213. Due to the presence of the capacitor 249 in the signal line 248 leading to the transistor 193, the conduction of the transistor 193 lasts only for a brief period, long enough to drain the capacitor 213, and then the transistor 193 is cut off again due to the lack of further base drive. Upon the cutoff of the transistor 193, the capacitor 213 recharges, providing base drive to the transistor 192 in the process.

The input signal to the second delay circuit 183 is transmitted from the collector of the transistor 243 via a capacitor 251 to the base of the transistor 252, where the positive signal cuts off conduction in the transistor 252, and charges a capacitor 253 whose charge operates to hold the transistor 252 cut off. The cutoff of the transistor 252 removes the positive bias applied via the resistor 256 to the base of the transistor 254, allowing the transistor 254 to begin conduction.

Conduction of the transistor 254 supplies current via the resistor 258 to the driving coil of the film advance relay 174. Closure of the relay 174 provides power to the film advancing solenoid 54. The duration of cutoff of the transistor 252 and conduction in the transistor 254 is governed by the draining of charge from the capacitor 253 via the resistor 257. Once that charge decays, the positive bias is removed from the base of the transistor 252 to allow resumption of conduction in that transistor. That conduction then cuts off the transistor 254 by supplying positive bias to its base via the resistor 256.

The purpose of the delay interposed by the first delay circuit 182 is to allow the shutter 26 time to close before the film is moved by the film drive 28. The second delay circuit 183 times the duration of the power supplied to the film advancing drive 28. At the end of the advancement of the film, the shutter 26 is reopened by the shutter control circuit 184 in response to receipt of the high-level (second output) signal on line 203 from the timing circuit 181, beginning a new cycle of operation. The new cycle of operation begins when the transistor 193 cuts off, permitting the capacitor 213 to recharge and thereby provide base drive to the transistor 192.

In the operation of the shutter control circuit 184, the transistor 188 acts as a switch in the ground return lin from the shutter solenoids 94. While only a single transistor 188 has been symbolically shown here, the preferred embodiment uses a pair of transistors in a Darlington-type cascade circuit exhibiting enhanced current gain characteristics. Upon conduction in the transistor 188, the ground return is completed to allow current flow from both the first power supply 186 and the second power supply 187 through the shutter solenoids 94. Prior to the conduction of the transistor 188, the delay means, capacitor 191, is charged via the resistor 259 and the diode 261. When the transistor 188 begins conduction, the potential is lowered between the resistor 259 and the diode 261 by the connection through the diode 263, the resistor 264 and the transistor 188 to the ground bus 206. The capacitor 191 then begins to discharge through the base-emitter junction of the transistor 189, maintaining the transistor 189 in conduction until the charge is dissipated.

Once the charge in the capacitor 191 is dissipated, the transistor 189 cuts off due to lack of base drive, and the supply of the second power supply voltage through the transistor 189 to the shutter solenoids 94 is terminated. The duration of the supply of the second supply voltage to the shutter solenoids is thus controlled by the capacity of the capacitor 191. The first supply voltage continues to be supplied to the shutter solenoids 94, as it is interrupted only by the transistor 188 in the ground return line. The transistor 266 functions as a series voltage regulator, with its reference level set by a zener diode 267.

The camera 21 is equipped with a number of interlock features which operate to make its use foolproof in the hands of untrained personnel. Among these are the disabling circuit which includes the low resistance 177 shunting the relay 174, the forced advancement circuit 178, the cassette switch 76, the cut and release switch 162, and the cassette counter lockout and end of film switches 269 and 271, respectively. The disabling circuit prevents advancement of film when portions of the camera are open which would tend to fog the film, as explained above. The amount of film fogged is thus minimized. The previously described microswitches 129 and 159 each have normally closed contacts which close upon the opening of the viewing door 109, and the removal of the data card 151, respectively. These switches are arranged in parallel, so closure of the normally closed contacts of either of them will provide the ground return for the low resistance 177 and thereby disable the film advance relay 174.

The forced advancement circuit 178 also operates through the microswitches 129 and 159, through their normally open contacts, and operates through the normally closed contacts of the data printing switch 268 and the first cam-actuated switch 169 as well. These switches are in parallel, so that the operation of any of them will cause the film to be advanced one frame width. In the case of the viewing door and data card switches 129 and 159, the purpose of the operation is to remove the fogged frame of film from the film gate 23 and bring up a fresh film for unfogged recording of data. The advancement of film is halted while the door 109 or the slot 153 are open, and on their reclosure, the fogged frame is removed.

In the case of the data print switch 268, closure of its normally open contact advances the film one frame and lights the data printing lamp 156 to print data from the data card 151 onto the back of the film as described above. After that printing, release of the switch 268 closes its normally closed contact, to advance the data bearing frame out of the film gate 23, and bring up a fresh frame or recording of the image of the oscilloscope face 99. The operation of the first cam-actuated switch 169 to move the last exposed frame into the cassette 31 before releasing the cassette has been described previously.

Each of the switch contacts operating in the forced advancement circuit 178 is connected to a trigger circuit 275 formed by a resistor, a capacitor and a diode, essentially similar in operation for all of the switches, and hence described only in connection with the switch 169, with the understanding that the description applies to all. Closure of the switch 169 provides a ground return for the network formed by the resistor 272, the capacitor 273 and the diode 274, connected to a line 276 leading to the base of the transistor 254. Completion of the ground return provides base drive to the transistor 254 to cause it to conduct and thereby energize the relay 174 to advance the film, regardless of the state of the signal on line 203 from the timing circuit 181.

The closure of those switch contacts in the switches 129 and 159 which operate the disabling circuit for the relay 174 also shunts the power supplied to the camera ready indicator lamp 277. This operates via the line 278, the resistor 279, and the diode 281 to provide an alternate ground return path for the power supplied to the lamp 277, shunting enough current away from the lamp that it is extinguished. A visual indication is thus given the camera operator that the camera is disabled by operation of one of the interlocks. The grounding of the line 278 through the NC contacts of switches 129 and 159 also grounds the base of the transistor 193 via the diode 215 to prevent the positive reset signal on line 248 from resetting the timing circuit 181.

The cassette switch 76 and the microswitch 137 which senses closure of the film loading door 131 are both placed in series with the power switch 282, so that power is not supplied to the major portion of the control circuitry unless the cassette is in place and the film loading door is closed. These interlocks prevent waste of film by fogging in the film supply compartment and by lack of the light-tight takeup cassette. The cut and release circuit operated by the cut and release switch 162 may also be regarded as an interlock, as the cassette 31 is not released from the housing 22 until enough film has been advanced to bring the last exposed frame within the cassette and the film has been severed. It can be appreciated that a number of potential film handling errors are obviated by this automatic sequence of operations.

The normally open contact of the cassette presence switch 76 is used to supply power to the balance of the control circuit, and a normally closed contact of that switch is used to supply the motive power to the retraction solenoid 53. Thus the idler or pinch roller 43 is retracted when the power is on but the cassette not inserted, to facilitate threading the film through the film advancement mechanism 28. After the film has been threaded between the drive roller 42 and the idler roller 43, the cassette 31 may be inserted, closing the switch 76 and thereby de-energizing the solenoid 53 to cause the idler roller 43 to be moved back to the position shown in solid lines in FIG. 6.

The camera is equipped with first and second electrically actuated counting devices, which are a cassette frame counter 283 and a film supply frame counter 284, respectively, both connected in parallel with the film advance solenoid 54. Each of the frame counters 283 and 284 may be preset by hand, and counts down one from the preset total each time the film is advanced by the output signal of the second delay circuit. The cassette counter 283 is preset each time a new run is begun with an empty cassette, to the number of exposures desired. When its countdown reaches a selected number, here chosen as zero, a switch means, the cassette counter lockout switch 269, is actuated by the counter 283 to halt operation of the camera after the desired number of exposures, while leaving the interlocks, and particularly the cut and release circuit 161 operative.

Stops may be set on the cassette counter 283 to limit the maximum number of exposures presettable to the maximum capacity of the cassette 31. in the present embodiment, that limit is approximately 100 frames of film, so the cassette counter 283 may be preset to no more than 99 exposures. With other capacities of the cassette 31 or other formats of the frame size, different limits would be established and the cassette counter 283 limited accordingly. The film supply counter 284 is preset to the amount of film loaded each time the camera is loaded, so that its countdown shows a running balance of the supply of film remaining. A relay 286 is also placed in parallel with the counters and the film advance solenoid 54, to switch power to the takeup motor 91 to wind up the film in the takeup cassette 31. A relay is used, as it is desired to power the takeup motor 91 with alternating current rather than the direct current used for powering some of the solenoids and counters.

Power is supplied to the film advance solenoid 54, the counters 283 and 284 and the relay 286 via a bridge circuit having a pair of diodes 287 and 288 connected back to back in two legs of the bridge, and a pair of silicon controlled rectifiers 289 and 291 connected back to back in the other two legs of the bridge. Gating of both of the SCRs 289 and 291 thus provides full-wave rectified current, as one SCR will be gated and forward-biased while the other is gated but reverse-biased on each half cycle of alternating supply voltage. Gating power for the SCRs is provided by a pair of diodes 292 and 293, whose output is switched by the relay 174 back to the gate terminals of the SCRs 289 and 291.

The end of film switch 271 is actuated by the emptying of the film supply roll 29, and stops further operation of the camera except for the interlocks and the cut and release circuit. Closure of the switch 271 provides gate current to a silicon controlled rectifier 270. When the SCR 270 conducts, it provides another ground return for the "camera not ready" light 277 via the diode 280, and it grounds the base of the transistor 239 via the diode 285, thus disabling the first delay circuit 182. The forced advancement circuits, and particularly the cut and release circuit 161 and the data print switch 268 remain operative as the second delay circuit 183 is not disabled.

A Z-shaped flexible wire feeler 294 bears against the film roll 29, and is pivotally attached to the side wall of the lens housing 127 by a hinge 296. A button 297 is attached to the feeler 294 to actuate the microswitch 271 mounted on the chassis 49. The film is guided off the supply roll 29 by a spring-loaded idler roller 298, biased away from the supply roll 29 about a pivot 295 in a fashion well known in the art, and by a fixed idler 299.

The manual shutter switch 301 applies a steady positive potential from the d.c. positive bus 202 via the switches 269 and 271, to the signal line 203 and thus to the base of the transistor 188 is the shutter control circuit. Application of this potential holds the shutter 26 open by the conduction of the transistor 188, when manual opening of the shutter is desired. Jacks 306 and 307 in parallel with the switches 301 and 212 permit remote control of the cycling and shutter opening in the camera.

The camera 21 is customarily mounted on the oscilloscope by a collar 303 attached to the front of the housing 22. The collar 303 fits over the bezel ring 304 of the oscilloscope, and is secured by a thumbscrew 302 threaded through the collar 303 and bearing on the bezel ring 304.

To ensure register of the frames of film in the gate 23, a cam detent mechanism generally indicated at 308 operates to bring the drive roller 42 to a halt at a repeatable position on each half turn. Since a half turn of the drive roller 42 advances one frame-width of film through the gate, the repeatability of the stopping point afforded by the detent mechanism 308 protects against overlapping images, wasted film, and any possible blurring of image due to coasting of the film motion.

The detent mechanism 308 includes a cam disk 309 fixed to the shaft of the drive mechanism 44 and a cam follower 311 mounted on the end of a pivoted arm 312. The arm 312 is in turn pivotally mounted on a short stub shaft 313 set into and upstanding from the top of the support block 316 which carries the drive rollers 42. A spring means 314, shown here as a helical torsion spring wrapped around the shaft 313, bears on the arm 312 to bias it and the follower 311 toward the cam disk 309.

The cam disk 309 has a pair of identically shaped notches spaced diametrically apart on its circumference. Each notch has an abruptly upturned face 317 and a longer downslope 318 leading into the notch. As the cam disk 309 and the drive roller 42 rotate clockwise as seen in FIG. 6, the effect of the notch shape is to cause the follower 311 to hand up against the steep face 317, stopping motion of the drive mechanism 44 at that rotational point if the solenoid 54 is no longer powered. Subsequent application of power to the solenoid 54 will cause the follower 311 to be forced up the face 317 against the tension of the spring means 314 as the cam disk 309 begins to turn.

The downslope 318 into the notch allows the pressure of the following 311 against the disk 309 to boost the rotary motion of the disk 309 as it approaches the end of its rotational cycle. This boost is desireable as solenoid power is cut off before full rotation to prevent riding over the face 317 and to allow the inertia of the system to be expended in finishing the cycle, yet for proper register, it is necessary that the rotation not stop before traversing the full half-circle.

The shaft 319 of the drive means 44 extends on up from the cam disk 309 and out through an opening in the top cover 321 of the camera, where it terminates in a screw slot 322. An annular light seal 323 prevents entry of stray light. Two ends are served by the projection of the shaft 319 through the top cover 321. First, the screw slot rotational position may be compared with an index mark (not shown) on the cover to determine that the drive mechanism 44 is stopping the film at the correct register points. Secondly, a screwdriver or coin may be inserted into the slot to rotate the drive roller 42 and advance the film for test or emergency purposes.

A guide system generally indicated at 324 channels the film 20 along the path from the gate 23 through the drive and idler rollers 42 and 43 and the cutoff mechanism 32. The guide system 324 includes two stiffly resilient guide plates, one plate 326 running along the emulsion side of the film 20 and the other plate 327 on the opposite, or backing, side of the film. The guide plate 326 is mounted on the side wall 127 of the lens system, and extends horizontally out from the wall between the idler rollers 43 as shown in FIG. 8. The guide plate 327 extends in the same fashion from the framework 328 behind the gate 23 (see FIG. 3). A tab 329 extends horizontally from the end of the rear guide plate 327 to ensure vertical register of the film after cutting.

From the foregoing, it may be seen that a data recording camera has been provided having totally automatic film transport through the camera and into a light-tight self-threading takeup cassette releasably held within the camera, precise timing of the sequential exposures, and interlocking to prevent spoilage of film by inexperienced or untrained personnel. The camera prevents data exposure onto fogged film and allows exposure of written data onto the film in the film gate, while preventing overfilling of the cassette.

We claim:

1. A data recording camera, comprising a first light-tight housing having a film exposure gate therein, a supply spindle for holding a supply of film within said housing, a shutter in said housing positioned to interrupt light passing from outside said housing to said gate, a lens system in said housing for imaging data at said film exposure gate, a film advancing mechanism for advancing film from said supply through said gate, a takeup cassette for receiving said film after said film passes through said gate, said cassette comprising a second light-tight housing having a light-tight entrance slot therein, and a takeup spindle journalled within said second housing and engageable from outside said cassette for rotation, said takeup spindle being adapted to grasp the end of said film and automatically roll said film up on said takeup spindle, a film cutoff mechanism in said first housing adjacent said entrance slot of said cassette and operative to sever said film adjacent said entrance slot, and a control circuit for controlling the operation of said shutter, film advancing mechanism and cutoff mechanism in a desired sequence, said control comprising an anti-advance interlock circuit operative to disable said film advancing mechanism, said anti-advance interlock circuit comprising a switch means activated by a movable portion of said camera to complete said anti-advance interlock circuit, whereby film advance will be disabled when said movable portion is moved.

2. A data recording camera is described in claim 1 and wherein said first housing is formed with a recess therein for accepting said takeup cassette, said cassette fitting within said recess to receive film from the interior of said first housing into the interior of said second housing without exposing the film to light, said first housing having an exit slot therein positioned to be juxtaposed with said entrance slot when said cassette is fully inserted into said recess, said camera further comprising a release mechanism operative to retain said cassette in said recess at selected times and to automatically release said cassette from said recess after operation of said film cutoff mechanism.

3. A data recording camera as described in claim 1 and wherein said film advancing mechanism comprising a drive roller disposed adjacent the path of the film through said camera downstream of said gate, an idler roller disposed adjacent the film path opposite said drive roller in confronting relation to the periphery of said drive roller, and a drive mechanism connected to said drive roller for rotating said drive roller to advance the film.

4. A data recording camera as described in claim 3 and wherein said film advancing mechanism further comprises a retraction mechanism connected between said drive roller and said idler roller and operative to move said drive roller and idler roller relative to each other into and out of said confronting relation.

5. A data recording camera as described in claim 4 and wherein said drive mechanism comprises a rotary-motion solenoid and said retraction mechanism comprises a linear-motion solenoid.

6. A data recording camera as described in claim 2 and wherein said control circuit further comprises a manual switch means for initiating a sequence of operations leading to ejection of said cassette from said first housing, and a cycling mechanism triggered by said switch and operative to first drive said film advancing mechanism to advance a predetermined length of film through said first housing and into said cassette, and secondly to trigger said film cut-off mechanism after said predetermined length has been advanced into said cassette, said release mechanism operating to release said cassette from said recess in response to the operation of said film cut-off mechanism.

7. A data recording camera as described in claim 6 and wherein said cycling mechanism comprises a drive motor actuated by said manual switch, and having a drive shaft, first and second cam means borne on said drive shaft, and first and second cam-actuated switch means having followers actuated by said first and second cam means respectively, said first switch means being actuated by said first cam means before said second switch means is actuated by said second cam means, said first switch means being connected to said control circuit to trigger operation of said film advancing means, and said second switch means being connected to said control circuit to trigger operation of said film cutoff means.

8. A data recording camera as described in claim 7 and wherein said first cam means actuates said first switch means a plurality of times for each actuation of said manual switch means to advance said film a plurality of frame lengths.

9. A data recording camera as described in claim 1 and wherein said first light-tight housing has a movable door therein giving access to said lens system, said door serving as said movable portion of said camera and said switch being activated by the opening of said door, whereby said film advancing mechanism will be disabled when said door is open.

10. A data recording camera as described in claim 1 and wherein said first light-tight housing has a movable door therein giving access to said supply spindle, said door serving as said movable portion of said camera and said switch means being activated by the opening of said door, whereby said film advancing mechanism will be disabled when said door is open.

11. A data recording camera as described in claim 1 and wherein said first housing is formed with a recess therein for accepting said takeup cassette, said cassette serving as said movable portion of said camera, said switch means being disposed in said recess and being activated by the removal of said cassette, whereby said film advancing mechanism will be disabled when said cassette is removed.

12. A data recording camera as described in claim 1 and wherein said data housing is formed with a data receiving slot, and said camera further comprises a data card having a transparent portion insertable through said slot into the interior of said camera adjacent said film exposure gate and a light source within said housing adapted to print the data from said data card onto the film in said exposure gate, said data card serving as said movable portion of said camera and said switch means being activated by the removal of said data card from said housing, whereby said film advancing mechanism will be disabled when said data card is removed.

13. A data recording camera as described in claim 1 and wherein said control circuit comprises a forced-advancement interlock circuit operative to force operation of said film advancing mechanism, said forced advancement circuit comprising a trigger circuit and a switch means activated by a movable portion of said camera to complete said trigger circuit, whereby film advancement will be forced when said movable portion is moved.

14. A data recording camera as described in claim 13 and wherein said first light-tight housing has a movable door therein giving access to said lens system, said door serving as said movable portion of said camera and said switch means being activated by the closing of said door, whereby said film advancing mechanism will be forced to operate when said door is reclosed.

15. A data recording camera as described in claim 13 and wherein said housing is formed with a data receiving slot, and said camera further comprises a data card having a transparent portion insertable through said slot into the interior of said camera adjacent said film exposure gate and a light source within said housing adapted to print the data from said data card onto the film in said exposure gate, said data card serving as said movable portion of said camera and said switch means being activated by the insertion of said data card into said slot, whereby said film advancing mechanism will be forced to operate when said data card is reinserted into said slot.

* * * * *